No. 897,928. PATENTED SEPT. 8, 1908
E. C. REITER.
HEAT RETAINER AND DRIP PAN.
APPLICATION FILED OCT. 3, 1907.
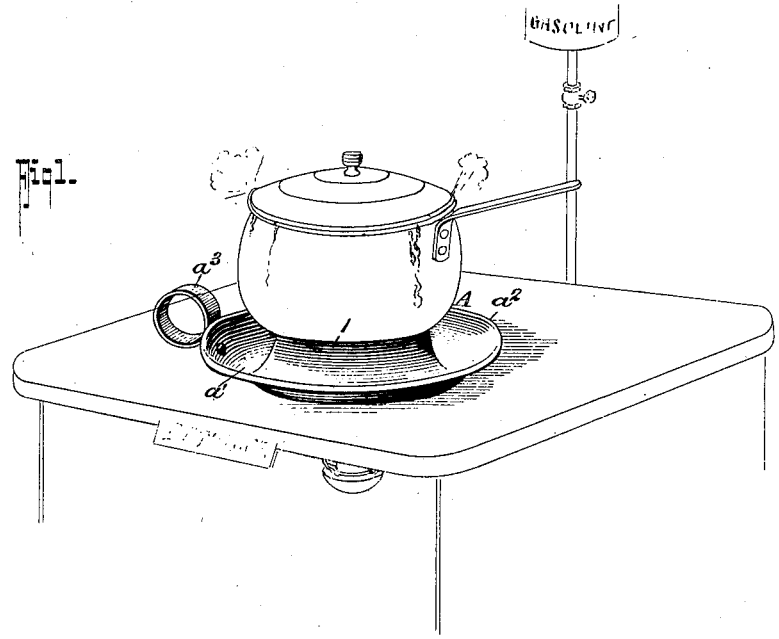
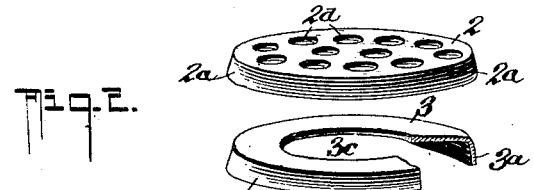
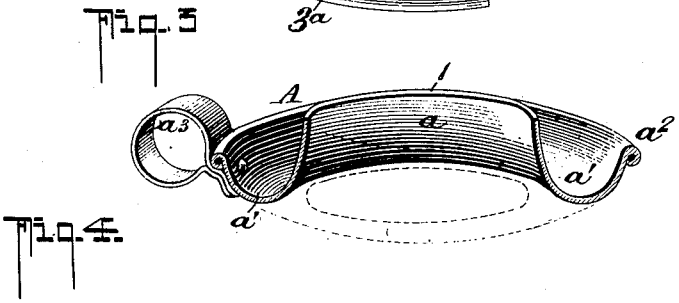
WITNESSES:
John T. Schrot
Hayward Woodard
INVENTOR
Edward Charles Reiter.
BY
Fred G. Dieterich & Co
ATTORNEYS.

UNITED STATES PATENT OFFICE.

EDWARD CHARLES REITER, OF ROCKVILLE, CONNECTICUT.

HEAT-RETAINER AND DRIP-PAN.

No. 897,928.

Specification of Letters Patent.

Patented Sept. 8, 1908.

Application filed October 3, 1907. Serial No. 395,734.

*To all whom it may concern:*

Be it known that I, EDWARD CHARLES REITER, residing at Rockville, in the county of Tolland and State of Connecticut, have invented a new and Improved Heat-Retainer and Drip-Pan, of which the following is a specification.

My invention seeks to provide a simple, economical and easily utilized appliance for use in connection with oil or gas stoves or ranges, primarily having for its object the preventing of the free escape of heat from the stove hole or burner and concentrates the heat under a cooking utensil in such manner that the cooking is very clearly effected and under a minimum expense of fuel.

Another object of my invention is to provide for catching the drippings from the cooking utensil whereby to keep the stove clean.

With the above and other objects in view, my invention consists in certain details of construction and peculiar arrangement of parts, all of which will be first described in detail and then be specifically pointed out in the appended claims, reference being had to the accompanying drawings, in which:—

Figure 1, is a perspective view that illustrates my invention as applied for use. Fig. 2, is a perspective view of the main removable cover plate. Fig. 3, is a perspective view similar to Fig. 2, of the supplemental cover plate, hereinafter referred to, a part being broken away. Fig. 4, is a transverse section of the main pan or supporting member, the same being also shown in perspective.

In carrying out my invention, the same embodies a main or supporting member that has the shape of an annular dished rim, the inner portion of which is extended vertically to form a collecting chamber $a$ and whose upper portion 1 terminates in a horizontal top edge, disposed in a plane above the outer wall $a^2$ of the rim $a'$ whereby to support the pot or other cooking utensil in a manner clearly understood from Fig. 1 of the drawing.

The member A has a handle $a^3$ for conveniently manipulating it as desired.

So far as described, it will be readily apparent since the dished rim $a'$ is of a diameter greatly in excess of the utensil supporting portion 1 that the drippings that overflow from the pot will drop down in the said dished rim and thereby not only keep the stove clean, but also prevent the greasy fluids from passing into the fire or flame of the heater.

When the body of the cooking utensil is of smaller diameter than the opening formed by portion 1 of the member A, a top or cover plate 2, that has apertures $2^d$, is removably placed upon the said portion 1, said cover plate having a pendent flange $2^a$ so as to snugly fit on the portion 1 and prevent the free escape of heat from the heat collecting chamber $a$. When it is desired to cook quickly, a supplemental cover plate 3 having a pendent flange $3^a$ and a single centrally disposed opening $3^c$ is used for concentrating the heat from the chamber $a$ directly under the center of the bottom of the utensil. For cooking slowly, the cover plate 2 which has the small apertures $2^d$ is used, since the said apertures serve to distribute the heat over the utensil bottom.

Having thus described my invention, what I claim and desire to secure by Letters Patent, is:—

1. A device of the character described, comprising a hollow dish shaped rim, whose inner wall extends vertically to form a heat concentrating chamber and an apertured cover plate adapted to be removably supported upon the said inner wall.

2. In a device of the character described, the combination with a hollow dish shaped annular rim, whose inner wall is vertically extended to form a heat concentrating chamber and an apertured cover plate having a pendent flange, said cover plate being adapted to removably fit upon the said inner wall, substantially as shown and described.

EDWARD CHARLES REITER.

Witnesses:
L. T. TINGIER,
A. P. DICKINSON.